(12) United States Patent
Grois et al.

(10) Patent No.: US 6,409,393 B1
(45) Date of Patent: Jun. 25, 2002

(54) FIBER OPTIC CONNECTOR ASSEMBLY AND METHOD OF ASSEMBLY

(75) Inventors: Igor Grois, Northbrook; B. Daniel Szilagyi, Downers Grove, both of IL (US)

(73) Assignee: Molex Incorporated, Lisle, IL (US)

( * ) Notice: Subject to any disclaimer, the term of this patent is extended or adjusted under 35 U.S.C. 154(b) by 0 days.

(21) Appl. No.: 09/507,246

(22) Filed: Feb. 18, 2000

(51) Int. Cl.[7] .................................................. G02B 3/36
(52) U.S. Cl. ........................................................ 385/78
(58) Field of Search .......................................... 385/78

(56) References Cited

U.S. PATENT DOCUMENTS 5,930,427 A * 7/1999 Parker
6,135,644 A * 10/2000 Hakogi et al.
6,254,283 B1 * 7/2001 Novacoski et al.

FOREIGN PATENT DOCUMENTS

| EP | 0 375 168 A1 | 6/1990 | ............ G02B/6/38 |
|---|---|---|---|
| EP | 0 967 502 A1 | 12/1999 | ............ G02B/6/38 |
| EP | 0 973 051 A1 | 1/2000 | ............ G02B/6/38 |
| JP | 10253850 | 3/1997 | ............ G02B/6/36 |
| JP | 10-253850 | 9/1998 | ............ G02B/6/36 |

* cited by examiner

*Primary Examiner*—Hung N. Ngo
(74) *Attorney, Agent, or Firm*—A. A. Tirva

(57) ABSTRACT

A fiber optic connector assembly includes a ferrule terminated to at least one optical fiber. A pusher member is spaced behind the ferrule. A spring is provided for biasing the ferrule forwardly. The spring is fixed to the pusher member to provide a self-contained subassembly comprising the spring and pusher member.

13 Claims, 3 Drawing Sheets

FIBER OPTIC CONNECTOR ASSEMBLY AND METHOD OF ASSEMBLY

FIELD OF THE INVENTION

This invention generally relates to the art of fiber optic transmission and, particularly, to a fiber optic connector assembly which includes a self-contained spring subassembly.

BACKGROUND OF THE INVENTION

Fiber optic connectors of a wide variety of designs have been employed to terminate optical fiber cables and to facilitate connection of the cables to other cables or other optic fiber transmission devices. A typical fiber optic connector includes a ferrule which mounts and centers an optical fiber or fibers within the connector. The ferrule may be fabricated of such material as ceramic. A ferrule holder or other housing component of the connector embraces the ferrule and may be fabricated of such material as molded plastic. A spring may be disposed within the housing or ferrule holder such that the ferrule is yieldably biased forwardly for engaging another fiber-mounting ferrule of a mating connecting device. A pusher member may be used to back-up the spring.

A pair of fiber optic connectors or a connector and another optical fiber transmission device often are mated in an adapter which centers the fibers to provide low insertion losses. The adapter couples the connectors together so that their encapsulated fibers connect end-to-end. The adapter may be an in-line component, or the adapter can be designed for mounting in an opening in a panel, backplane, circuit board or the like.

Various problems continue to be encountered in designing fiber optic connector assemblies, and those problems often evolve around the very small size of a typical fiber optic connector assembly and its various components. For instance, as stated above, a spring typically is used to bias the ferrule (and the fiber(s) fixed thereto) forwardly or toward a mating connecting device. This spring typically is a coil spring which simply is sandwiched between the ferrule and another component such as a pusher member. The spring is very small and has a tendency to become misaligned or even fall away from the assembly when the connector is being assembled or when the assembly is being terminated to a fiber optic cable. The present invention is directed to solving these problems by making the spring a part of a self-contained subassembly so that it is maintained in its predetermined position during assembly.

SUMMARY OF THE INVENTION

An object, therefore, of the invention is to provide a new and improved fiber optic connector assembly of the character described, along with a method of assembling the connector.

In the exemplary embodiment of the invention, the assembly includes a ferrule terminated to at least one optical fiber. A pusher member is spaced behind the ferrule. A spring is provided for biasing the ferrule forwardly. The spring is fixed to the pusher member to provide a self-contained subassembly comprising the spring and pusher member.

As disclosed herein, a pin keeper is engageable with a rear end of the ferrule. At least one alignment pin extends from the pin keeper through the ferrule and projects beyond a front end of the ferrule for operative association with a complementary connecting device. The spring is sandwiched between the pusher member and the pin keeper when the connector is assembled.

The spring is shown as a coil spring with a rear end thereof fixed to the pusher member. The pusher member has a receptacle at a front end thereof for receiving the rear end of the coil spring. The receptacle includes a retainer, such as a flange, for locking behind a coil of the coil spring. The spring is generally oval in cross-section to facilitate the use of a tool for fixing the coil spring to the pusher member.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE PREFERRED EMBODIMENT

Figure 1:
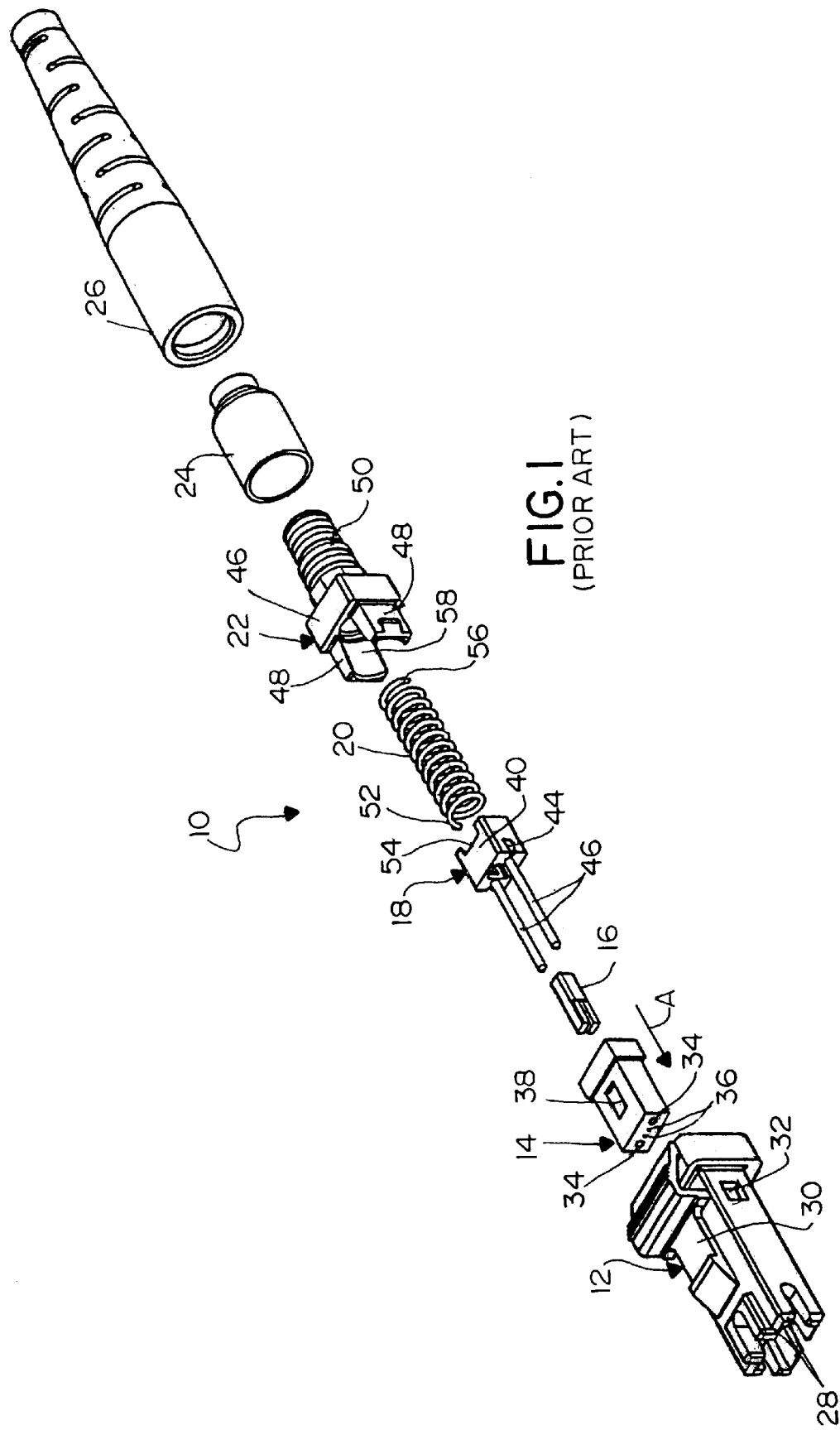
FIG. 1 is an exploded perspective view of the components of a fiber optic connector assembly according to the prior art.

Referring to the drawings in greater detail, and first to FIG. 1, the components of a prior art fiber optic connector assembly, generally designated 10, are shown. The connector assembly includes a connector housing, generally designated 12; a ferrule, generally designated 14; a ferrule boot 16; an alignment pin assembly, generally designated 18; a round coil spring 20; a spring pusher member, generally designated 22; a crimp ring 24 and a boot 26.

Connector housing 12 of prior art connector assembly 10 includes a front mating end 28 for mating with a complementary fiber optic connector assembly or other fiber optic transmission means. The housing typically is inserted into one end of an adapter, and a latch arm 30 is provided for locking the connector assembly in the adapter. Ferrule 14 is inserted into housing 12 in the direction of arrow "A" and is latched behind latch shoulders 32 on the inside of the housing. The ferrule includes a pair of through holes 34 for receiving a pair of alignment pins described hereinafter. A plurality of through passages 36 in the ferrule receive the fibers of a fiber optic cable, as described hereinafter. Ferrule boot 16 facilitates mounting the fibers within the ferrule. As stated in the "Background", above, the ferrule may be fabricated of such material as plastic. Finally, the ferrule includes a top opening 38 for receiving appropriate epoxy which fixes the optical fibers and the alignment pins within the ferrule.

Alignment pin assembly 18 includes a pin holding block 40 which may be fabricated of plastic material. The rear ends of a pair of alignment pins 42 are fixed within slots 44 in block 40. The alignment pins are inserted through holes 34 in ferrule 14 and are of sufficient length so that the pins project beyond the front of the ferrule for insertion into alignment holes in the ferrule of the complementary mating connecting device to align the mating ferrules end-to-end.

Spring pusher member 32 also may be fabricated of molded plastic material. The pusher member includes a body 46, a pair of laterally spaced flanges 48 projecting forwardly of the body and a hollow or cylindrical portion 50 projecting rearwardly of the body. The exterior of the cylindrical portion has raised rings or serrations for purposes described hereinafter.

Spring 20 is a coil spring having a round cross-configuration. The coil spring has a front end 52 positionable within a receptacle 54 at the rear of block 40 of alignment pin assembly 18, along with a rear end 56 positionable within a receptacle 58 defined by flanges 48 of pusher member 22.

Crimp ring 54 is used for crimping the strength members of a fiber optic cable onto the exteriorly serrated cylindrical portion 50 of pusher member 22. The crimp ring typically is fabricated of crimpable metal material. A flexible or elastomeric boot 26 surrounds the fiber optic cable and is press-fit over the crimp ring to provide strain relief for the cable extending away from the fiber optic connector.

From the above, it can be understood that ferrule 14 is latched within housing 12 and alignment pins 42 are fixed by epoxy within the ferrule so that the components at the front end of the connector (namely: housing 12, ferrule 14, boot 16 and alignment pin assembly 18) are fixed as a subassembly. At the rear of the connector, pusher member 22, crimp ring 24 and boot 26 also are eventually fixed together by crimping or a press-fit. That leaves coil spring 20 as a loose component which causes problems during manufacture and/or assembly in that the spring continuously becomes misaligned or even falls away from the assembly. The present invention solves these problems as described below.

Figures 2, 3:
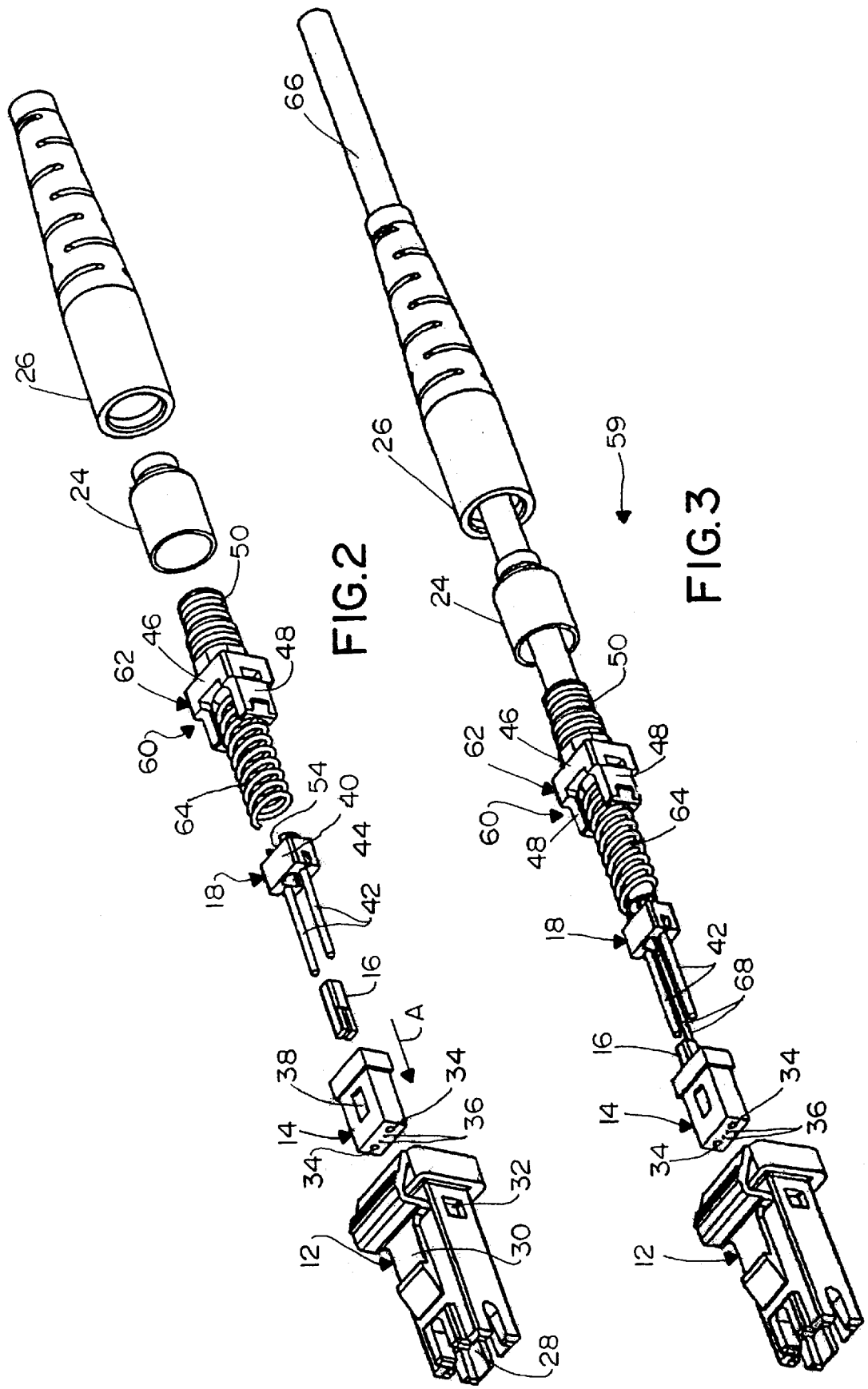
FIG. 2 is an exploded perspective view of the components of a fiber optic connector assembly according to the invention.
FIG. 3 is an exploded perspective view similar to that of FIG. 2, with the components being assembled to a fiber optic cable.

Specifically, FIG. 2 shows the components of a fiber optic connector assembly, generally designated 59, according to the invention. Many of the components of the assembly are the same or similar to prior art fiber optic connector assembly 10 and their description or function will not be described or repeated. Consequently, like reference numerals have been applied in FIGS. 2 and 3 corresponding to like components described above and shown in FIG. 1.

Specifically, the invention contemplates a self-contained spring subassembly, generally designated 60, which comprises a pusher member, generally designated 62 fixed to a coil spring 64. Therefore, the spring no longer remains loose and does not cause the problems described above.

FIG. 3 shows a fiber optic cable 66 being assembled to fiber optic connector assembly 59. The cable extends through boot 26, crimp ring 24 and spring subassembly 60. Strength members (not shown) of the cable are crimped onto exteriorly serrated cylindrical portion 50 of pusher member 62, and fibers 68 of the cable extend through block 40 of alignment pin assembly 18 and are epoxied within ferrule 14.

Figure 4:
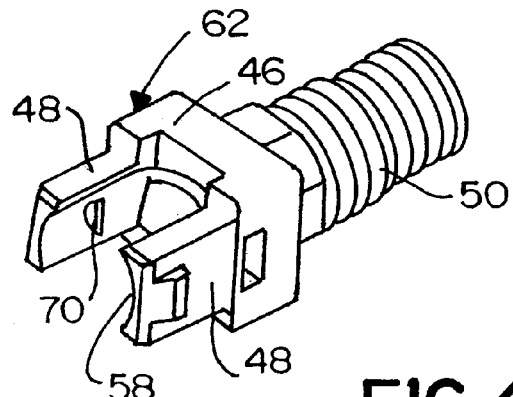
FIG. 4 is a perspective view of the spring pusher member before the spring is fixed thereto.

FIG. 4 shows spring pusher member 62 with coil spring 64 (FIGS. 2 and 3) removed to show that the pusher member includes a retainer boss 70 on the inside of each side flange 48 to provide retaining means on opposite sides of receptacle 58. Retainer bosses 70 are effective for locking behind an end coil of coil spring 64 as described below.

Figure 5:
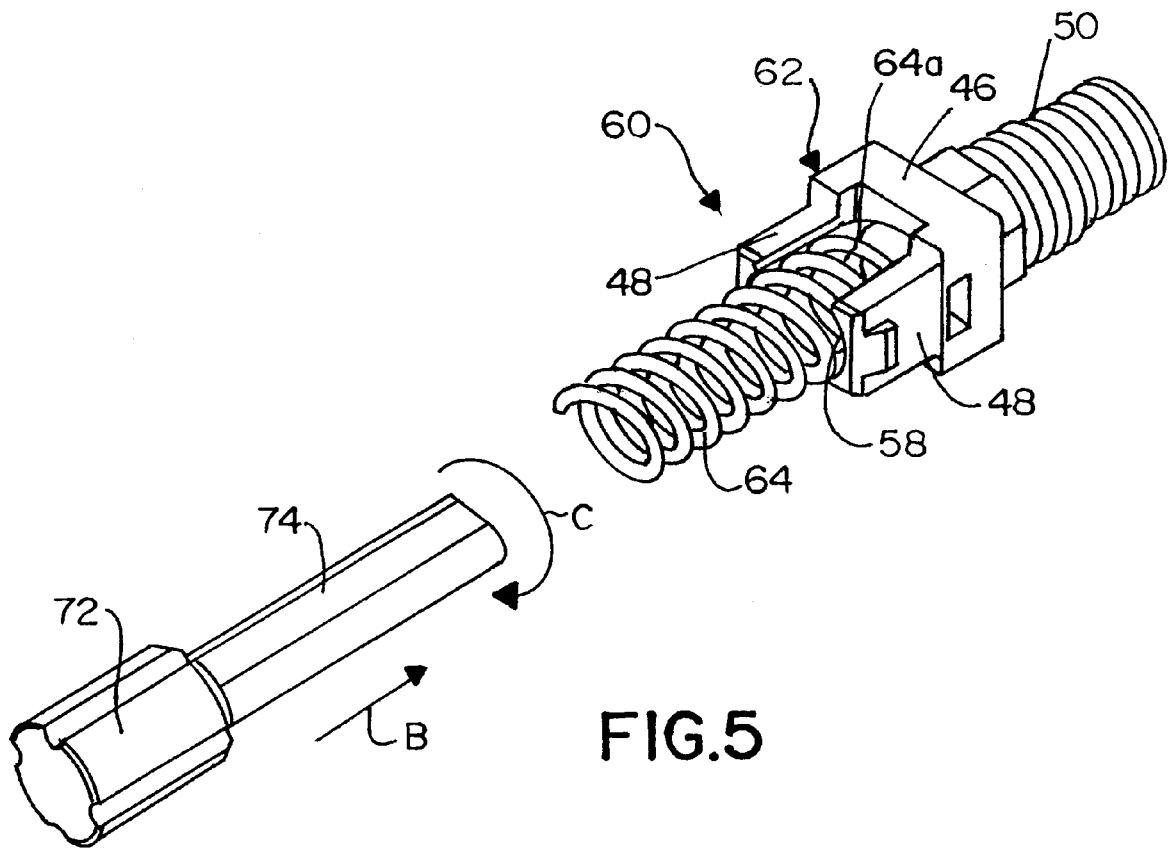
FIG. 5 is a perspective view of the pusher member with the spring fixed thereto to form a self-contained subassembly, in conjunction with a tool used to lock the spring to the pusher member.

In particular, FIG. 5 shows coil spring 64 fixed to pusher member 62 within receptacle 58. In essence, retainer bosses 70 (FIG. 4) lock behind a rear and coil 64a of the coil spring. It should be noted that coil spring 64 is oval in cross-configuration, in contrast to the round cross-configuration of coil spring 20 of prior art connector assembly 10 (FIG. 1). A tool 72 has a generally oval shaft 74 for insertion in the direction of arrow "B" into oval coil spring 64. The tool then is rotated in the direction of arrow "C" to effectively rotate the coil spring and to cause the rear open end coil 64a to lock behind retention bosses 70 (FIG. 4) of pusher member 62. This spring subassembly comprising the coil spring and the pusher member thereby prevents the coil spring from becoming misaligned or loosely falling away during manufacture and/or assembly of fiber optic connector assembly 59.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

We claim:

1. A fiber optic connector assembly, comprising:
    a ferrule terminated to at least one optical fiber;
    a pin keeper engageable with a rear end of the ferrule;
    at least one alignment pin extending from the pin keeper through the ferrule and projecting beyond a front end of the ferrule for operative association with a complementary connecting device;
    a pusher member spaced behind the pin keeper; and
    a spring sandwiched between the pusher member and the pin keeper, the spring being fixed to the pusher member to provide a self-contained subassembly comprising the spring and pusher member.

2. The fiber optic connector assembly of claim 1 wherein said spring is a coil spring with a near end thereof fixed to the pusher member.

3. The fiber optic connector assembly of claim 2 wherein said pusher member has receptacle means at a front end thereof for receiving the rear end of the coil spring.

4. The fiber optic connector assembly of claim 3 wherein said receptacle means includes a retainer for locking behind a coil of the coil spring.

5. The fiber optic connector assembly of claim 2 wherein said coil spring is generally oval in cross-configuration.

6. A fiber optic connector assembly, comprising:
    a ferrule terminated to at least one optical fiber;
    a pusher member spaced behind the ferrule; and
    a spring positioned between the ferrule and the pusher member for biasing the ferrule forwardly, the spring being fixed to the pusher member to provide a self-contained subassembly comprising the spring and pusher member.

7. The fiber optic connector assembly of claim 6 wherein said spring is a coil spring with a near end thereof fixed to the pusher member.

8. The fiber optic connector assembly of claim 7 wherein said pusher member has receptacle means at a front end thereof for receiving the rear end of the coil spring.

9. The fiber optic connector assembly of claim 8 wherein said receptacle means includes a retainer for locking behind a coil of the coil spring.

10. The fiber optic connector assembly of claim 7 wherein said coil spring is generally oval in cross-configuration.

11. A method of assembling a fiber optic connector, comprising the steps of:
    providing a ferrule for termination to at least one optical fiber;

providing a pusher member spaced behind the ferrule and including a retainer portion;

providing a coil spring for biasing the ferrule forwardly and with an open rear coil; and rotating the coil spring so that its open rear coil locks behind the retainer portion of the pusher member to provide a self-contained subassembly comprising the spring and pusher member.

12. The method of claim 11, including providing said coil spring of a generally oval cross-configuration.

13. The method of claim 12, including the step of providing a tool having an oval portion insertable into the oval coil spring and rotating the tool to thereby rotate the coil spring and engage the open rear coil with the retainer portion of the pusher member.

\* \* \* \* \*